United States Patent
Fraser et al.

(10) Patent No.: US 7,160,371 B2
(45) Date of Patent: *Jan. 9, 2007

(54) METHOD OF IMPROVING PIGMENT FLUORESCENCE

(75) Inventors: Iain Frank Fraser, Kilbirnie (GB); Sharon Kathleen Wilson, Amsterdam (NL); Ian Alexander Macpherson, Fife (GB)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/136,644

(22) Filed: May 24, 2005

(65) Prior Publication Data

US 2005/0218378 A1  Oct. 6, 2005

Related U.S. Application Data

(63) Continuation of application No. 10/415,404, filed as application No. PCT/EP01/12928 on Nov. 8, 2001, now Pat. No. 6,923,856.

(30) Foreign Application Priority Data

Nov. 17, 2000 (EP) .................................. 00811093

(51) Int. Cl.
*C09K 11/00* (2006.01)
*C09D 5/00* (2006.01)

(52) U.S. Cl. ................................ 106/31.15; 106/31.64; 106/493; 106/499; 252/301.16; 252/301.36

(58) Field of Classification Search ............. 106/31.15, 106/31.64, 493, 496, 499; 252/301.16, 301.36
See application file for complete search history.

(56) References Cited

U.S. PATENT DOCUMENTS

| | | | | |
|---|---|---|---|---|
| 4,508,650 | A | 4/1985 | Tokoli et al. | 540/140 |
| 4,927,466 | A | 5/1990 | Hays | 106/494 |
| 5,440,060 | A | 8/1995 | Uhrig et al. | 559/107 |
| 5,716,445 | A * | 2/1998 | Stirling et al. | 106/496 |
| 5,800,609 | A * | 9/1998 | Tuck et al. | 106/496 |
| 5,863,459 | A | 1/1999 | Merchak et al. | 252/301.16 |
| 5,889,162 | A | 3/1999 | Hays | 534/581 |
| 5,904,878 | A | 5/1999 | Merchak et al. | 252/301.16 |
| 5,944,881 | A * | 8/1999 | Mehta et al. | 106/31.28 |
| 6,683,124 | B1 | 1/2004 | Webster | 524/99 |
| 6,923,856 | B1 * | 8/2005 | Fraser et al. | 106/496 |

FOREIGN PATENT DOCUMENTS

| | | |
|---|---|---|
| EP | 0585812 | 3/1994 |
| EP | 0758004 | 2/1997 |
| EP | 0790282 | 8/1997 |
| JP | 6-272049 A * | 9/1994 |

OTHER PUBLICATIONS

CAS Registry No. 5468-75-7, "Pigment Yellow 14" (no date).
CAS Registry No. 15541-56-7, "Pigment Yellow 12" (no date).
CAS Registry No. 14569-54-1, "Pigment Yellow 63" (no date).
CAS Registry No. 6505-28-8, "Pigment Orange 16" (no date).

* cited by examiner

*Primary Examiner*—Anthony J. Green
(74) *Attorney, Agent, or Firm*—Joseph C. Suhadolnik

(57) ABSTRACT

A process for the preparation of organic pigments with enhanced fluorescence, which process comprises treating said pigments with a surfactant, and to the fluorescent organic pigments obtained by said process. The pigments according to the present invention can be used in marking applications, wherein durable fluorescence is required.

1 Claim, 1 Drawing Sheet

ABSTRACT

METHOD OF IMPROVING PIGMENT FLUORESCENCE

Figure 1:
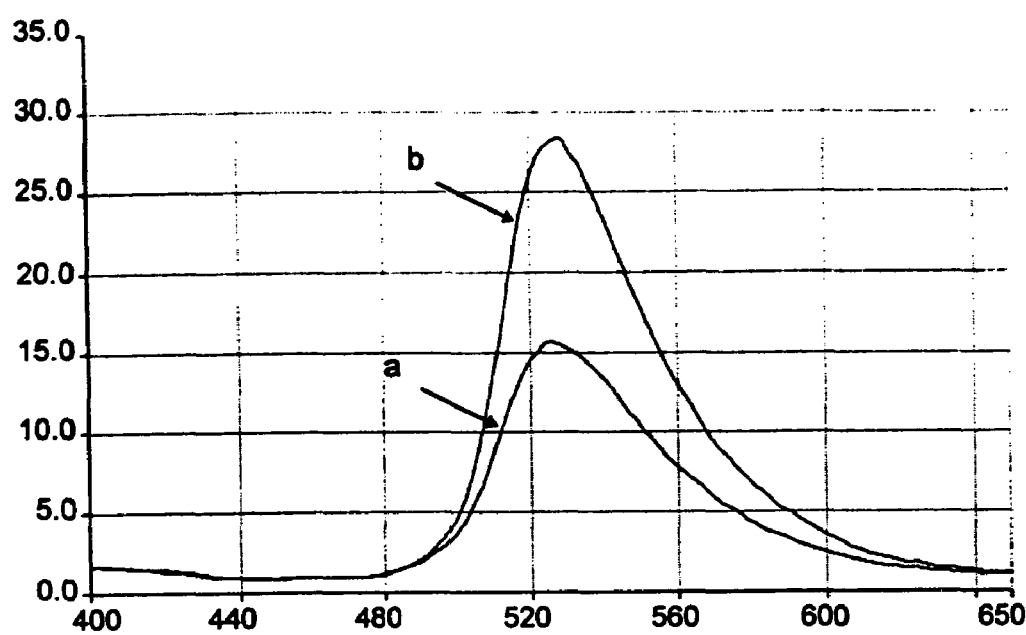

This application is a continuation of U.S. application Ser. No. 10/415,404, filed Apr. 29, 2003, now U.S. Pat. No. 6,923,856, which is the National Stage of International Application No. PCT/EP01/12928, filed Nov. 8, 2001 which U.S. application is hereby incorporated by reference.

The present invention is directed to a process for enhancing the fluorescence intensity of organic pigments, the organic pigments obtained by said process and the use of said pigments as colouring agents, in particular in marking applications, such as special effect printing or security printing.

Pigments are differentiated from dyes by their physical characteristics rather than by chemical composition. Dyes, unlike pigments, do dissolve during their application and in the process lose their crystal or particulate structure.

Fluorescent colourants, which generally are based on organic dyes, represent an important class of materials commonly used in colouring printing inks, paints and plastics to impart a desired color. Such colourants often referred to as industrial fluorescent pigments are obtained by dissolving a fluorescent dye in a suitable media, such as a resin matrix. The resin matrix is then broken to a specific size, typically of several microns, so that it may be used as a pigment.

In general, organic pigments exhibit no fluorescence or their fluorescence is only of low intensity. The prior art only describes a limited number of fluorescent organic pigments, as, for example, fluorescent Pigment Yellow 101 described in W. Herbst and K. Hunger, *Industrial Organic Pigments*, $2^{nd}$ Ed., VCH Verlagsgesellschaft, Weinheim, 1997, 571–572.

Compared to dyes, pigments have several advantages, such as their good lightfastness properties or weather resistance.

Therefore, it is desirable to impart flourescence to organic pigments, so as to obtain fluorescent organic pigments which may find application, e.g. in special effect printing or security printing applications showing the advantageous properties inherent to the physical characteristics of pigments and thus representing a favorable alternative to the fluorescent dyes mentioned above.

U.S. Pat. Nos. 5,863,459 and 5,904,878 describe a method of enhancing the fluorescence of yellow and orange diarylide pigments by, first, isolating the synthesized pigment as a dry powder and, then, adding the dried pigment to an organic solvent or water to obtain a slurry which is subjected to a heat treatment under elevated pressure for several hours. The maximum increase in spectral response achieved by the method of the prior art relative to the untreated pigment is by approximately 8% when the fluorescence of an ink formulation drawn down onto a substrate is measured with a spectrophotometer. Treatment of the pigment slurry in an organic solvent, such as ethanol, yields a fluorescence intensity enhancement approximately twice the amount as is achieved by treatment in water. It is a disadvantage of the prior art that the pigment has to be isolated prior to the treatment and that the treatment requires an organic solvent in order to obtain appreciable results. Treatment of the pigment under severe conditions is considered as a further disadvantage.

Therefore, still a need exists for fluorescent organic pigments, which can be obtained by a straight forward, and easy to carry out process that does not show the disadvantages of the prior art and which pigments show fluorescence of high intensity.

It has been found that the fluorescence intensity of organic pigments can be considerably enhanced, when the pigments are treated with surfactants.

Accordingly, it is an object of the present invention to provide a process for the preparation of organic pigments with enhanced fluorescence, which process comprises treating the pigments with a surfactant.

As organic pigments there come into consideration, for example, azo pigments or polycyclic pigments, such as those described in W. Herbst and K. Hunger, *Industrial Organic Pigments*, $2^{nd}$ Ed., VCH Verlagsgesellschaft, Weinheim, 1997, 187 ff.

In a preferred embodiment of the present invention the organic pigments are azo pigments, preferably yellow or orange azo pigments and in particular yellow or orange disazo pigments. Reference is hereby made to the yellow or orange disazo pigments described on pages 237–270 in W. Herbst and K. Hunger, *Industrial Organic Pigments*, $2^{nd}$ Ed., VCH Verlagsgesellschaft, Weinheim, 1997, in particular to diarylide yellow or diarylide orange pigments described in the document referred to, for example C.I. Pigment Yellow 12, C.I. Pigment Yellow 13, C.I. Pigment Yellow 14, C.I. Pigment Yellow 17, C.I. Pigment Yellow 55, C.I. Pigment Yellow 63, C.I. Pigment Yellow 81, C.I. Pigment Yellow 87, C.I. Pigment Yellow 90, C.I. Pigment Yellow 106, C.I. Pigment Yellow 113, C.I. Pigment Yellow 114, C.I. Pigment Yellow 121, C.I. Pigment Yellow 124, C.I. Pigment Yellow 126, C.I. Pigment Yellow 127, C.I. Pigment Yellow 136, C.I. Pigment Yellow 152, C.I. Pigment Yellow 170, C.I. Pigment Yellow 171, C.I. Pigment Yellow 172, C.I. Pigment Yellow 174, C.I. Pigment Yellow 176, C.I. Pigment Yellow 188, C.I. Pigment Orange 15, C.I. Pigment Orange 16 and C.I. Pigment Orange 44.

Especially preferred is a process, wherein the organic pigments are selected from the group consisting of C.I. Pigment Yellow 12, C.I. Pigment Yellow 13, C.I. Pigment Yellow 14, C.I. Pigment Yellow 17, C.I. Pigment Yellow 63, C.I. Pigment Yellow 83 and C.I. Pigment Orange 16, in particular C.I. Pigment Yellow 12, C.I. Pigment Yellow 14, C.I. Pigment Yellow 63 and C.I. Pigment Orange 16.

Especially preferred is furthermore a process, wherein the organic pigments are selected from the group of mixed coupled pigments consisting of C.I. Pigment Yellow 127, C.I. Pigment Yellow 174, C.I. Pigment Yellow 176 and C.I. Pigment Yellow 188.

Suitable surfactants which can be used within the scope of the present invention may be anionic, cationic, non-ionic, amphoteric or polymeric and covers all classes of surface-active compounds, for example acetates, betaines, glycinates, imidazolines, propionates, alkyl sulphates, alkylaryl sulphonates, alkylarylether carboxylates, alkylarylether sulphates, alkylether carboxylates, alkylether sulphates, phosphate esters, sarcosinates, sulphosuccinates, taurates, amides, amidoamines, amine salts, amines, diamines, polyamines, imidazolines, quaternaries, alcohol ethoxylates, alkylphenol ethoxylates, amide ethoxylates, amine ethoxylates, ester ethoxylates, fatty acid ethoxylates, glyceride ethoxylates, alkylolamides and amine oxides. Such surfactants are described in detail in K. Lindner, *Tenside-Textilhilfsmittel-Waschrohstoffe*, Bd. 1, Wissenschaftliche Verlagsgesellschaft Stuttgart, 1964, 561–1086, or in *Surfactants*

*Europa—a directory of surfactants available in Europe*, 3rd Ed., Ed. G. L. Hollis, The Royal Society of Chemistry, 1995.

Either one single surfactant or mixtures of two or more surfactants can be used.

Preference is given to anionic, cationic or non-ionic surfactants.

1. As examples of anionic surfactants there may be mentioned:

1.1 Dialkyl sulfosuccinates in which the alkyl moieties are branched or unbranched, for example dipropyl sulfosuccinate, diisobutyl sulfosuccinate, diamyl sulfosuccinate, bis(2-ethyl hexyl)sulfosuccinate or dioctyl sulfosuccinate.

1.2 Sulfated or sulfonated fatty acids or fatty acid esters of fatty acids, for example sulfated oleic acid, elaidic acid or ricinolic acid and the lower alkyl esters thereof, for example the ethyl, propyl or butyl esters. Also very suitable are the corresponding sulfated oils, such as olive oil, rapeseed oil or castor oil.

1.3 Reaction products of ethylene oxide and/or propylene oxide with saturated or unsaturated fatty acids, fatty alcohols, fatty amines, alicyclic alcohols or aliphatic-aromatic hydrocarbons that are terminally esterified with an inorganic oxygen-containing acid or a polybasic carboxylic acid. Such compounds are preferably compounds of formula $$R\text{-}A\text{-}(CH_2CH_2O)_p\text{-}Q,$$

wherein R is an aliphatic hydrocarbon radical having from 8 to 22 carbon atoms or a cycloaliphatic or aliphatic-aromatic hydrocarbon radical having from 10 to 22 carbon atoms; A is —O—, —NH— or —CO—O—; Q is the acid radical of an inorganic, polybasic acid or the radical of a polybasic carboxylic acid and p is a number from 1 to 20, preferably from 1 to 5. The radical R-A- is derived, for example, from a higher alcohol, such as decyl alcohol, lauryl alcohol, tridecyl alcohol, myristyl alcohol, cetyl alcohol, stearyl alcohol, oleyl alcohol, arachidyl alcohol, hydroabietyl alcohol or behenyl alcohol; from a fatty amine, such as laurylamine, myristylamine, stearylamine, palmitylamine or oleylamine; from a fatty acid, such as caprylic acid, capric acid, lauric acid, myristic acid, palmitic acid, stearic acid, arachidic acid, behenic acid, coconut fatty ($C_8$–$C_{18}$) acid, decenoic acid, dodecenoic acid, tetradecenoic acid, hexadecenoic acid, oleic acid, linoleic acid, linolenic acid, eicosenoic acid, docosenoic acid or clupanodonic acid; or from an alkylphenol, such as butylphenol, hexylphenol, n-octylphenol, n-nonylphenol, p-tert-octylphenol, p-tert-nonylphenol, decylphenol, dodecylphenol, tetradecylphenol or hexadecylphenol.

The acid radical Q is normally derived from a low-molecular-weight dicarboxylic acid, such as maleic acid, malonic acid, succinic acid or sulfosuccinic acid, and is linked by way of an ester bridge to the radical R-A-$(CH_2CH_2O)_p$—. Preferably, however, Q is derived from an inorganic polybasic acid, such as orthophosphoric acid or sulfuric acid. The acid radical Q is preferably in salt form, for example in the form of an alkali metal salt, ammonium salt or amine salt. Examples of such salts are sodium, potassium, ammonium, trimethylamine, ethanolamine, diethanolamine and triethanolamine salts.

1.4 Alkylaryl sulfonic acids in which the alkyl moieties are branched or unbranched, for example iso-propyl, n- or iso-butyl, n- or iso pentyl, n-hexyl, n-heptyl, n-octyl, n-nonyl, n-decyl, n-dodecyl, n-tetradecyl, n-hexadecyl or n-octadecyl and in which the aryl moieties are, for example phenyl or naphthyl. Examples of suitable alkylaryl sulfonic acids are decylbenzenesulfonic acid, dodecylbenzenesulfonic acid, tetradecylbenzenesulfonic acid, hexadecylbenzenesulfonic acid and octadecylbenzenesulfonic acid.

The anionic surfactants are normally in the form of their alkali metal salts, e.g. sodium or potassium salts, their ammonium salts or their water-soluble amine salts.

2. As suitable cationic surfactants there may be mentioned, for example, amines of formula $$R\text{—}N(R_1R_2) \times HAc,$$

and the onium compounds, such as ammonium-, sulfonium- and phosphonium compounds of formulae $$[R\text{—}N(R_1R_2R_3)]^+ \times Ac^-,$$

$$[R\text{—}S(R_1R_2)]^+ \times Ac^- \text{ and}$$

$$[R\text{—}P(R_1R_2R_3)]^+ \times Ac^-,$$

preferably the amines, wherein R is an aliphatic hydrocarbon radical having from 8 to 22, preferably 8 to 18 carbon atoms; $R_1$, $R_2$ and $R_3$ independently from one another are low aliphatic hydrocarbon radicals having from 1 to 4 carbon atoms; e.g. methyl or ethyl; aralkyl, e.g. benzyl; or aryl, e.g. phenyl; and Ac is an anionic radical, e.g. sulfate, chloride, bromide or acetate. In the amine type surfactant $R_1$ and $R_2$ can furthermore be hydrogen and one of $R_1$ and $R_2$ can furthermore be an aliphatic hydrocarbon radical having from 8 to 22, preferably 8 to 18 carbon atoms.

The cationic surfactants mentioned, are obtained by commonly known methods, for example from fatty acids, such as caprylic acid, capric acid, lauric acid, myristic acid, palmitic acid, stearic acid, arachidic acid, behenic acid, coconut fatty ($C_8$–$C_{18}$) acid, decenoic acid, dodecenoic acid, tetradecenoic acid, hexadecenoic acid, oleic acid, linoleic acid, linolenic acid, eicosenoic acid, docosenoic acid or clupanodonic acid; fatty alcohols, such as decyl alcohol, lauryl alcohol, tridecyl alcohol, myristyl alcohol, cetyl alcohol, stearyl alcohol, oleyl alcohol, arachidyl alcohol, hydroabietyl alcohol or behenyl alcohol; alkyl- or aralkyl halogenides, such as methylbromide, ethylbromide, methylchloride, benzylbromide, benzylchloride, n-propylbromide, n-butylbromide, n-pentylbromide, n-hexylbromide, n-heptylbromide, n-octylbromide, n-nonylbromide, n-decylbromide, n-dodecylbromide, n-tetradecylbromide, n-hexadecylbromide or n-octadecylbromide.

Preferred amine type surfactants are N,N-dimethylcocoamine and N,N-dicocomethylamine, in particular N,N-dimethylcocoamine.

3. As examples of non-ionic surfactants there may be mentioned:

ethylene oxide adducts from the class of the addition products of ethylene oxide with higher fatty acids, saturated or unsaturated fatty alcohols, fatty amines, mercaptans, fatty acid amides, fatty acid alkylolamides or fatty amines, or with alkylphenols or alkylthiophenols, which adducts preferably contain from 5 to 100 mol of ethylene oxide per mol of the mentioned compounds, as well as ethylene oxide-propylene oxide block polymers and ethylenediamine-ethylene oxide-propylene oxide adducts. Such non-ionic surfactants include:

3.1 reaction products of saturated and/or unsaturated fatty alcohols having from 8 to 20 carbon atoms containing from 20 to 100 mol of ethylene oxide per mol of alcohol, preferably saturated linear $C_{16}$–$C_{18}$alcohols containing from 25 to 80 mol, preferably 25 mol, of ethylene oxide per mol of alcohol;

3.2 reaction products of saturated and/or unsaturated fatty acids having from 8 to 20 carbon atoms containing from 5 to 20 mol of ethylene oxide per mol of acid;

3.3 reaction products of alkylphenols having from 7 to 12 carbon atoms containing from 2 to 25 mol of ethylene oxide per mol of phenolic hydroxy group, preferably reaction products of mono- or di-alkylphenols containing from 5 to 20 mol of ethylene oxide per mol of phenolic hydroxy group, e.g. nonyl phenol ethoxylate containing 5 moles of ethylene oxide.

3.4 reaction products of saturated and/or unsaturated fatty acid amides having up to 20 carbon atoms containing from 5 to 20 mol of ethylene oxide per mol of acid amide, preferably oleyl amides containing from 8 to 15 mol of ethylene oxide per mol of acid amide;

3.5 reaction products of saturated and/or unsaturated fatty acid amines having from 8 to 20 carbon atoms containing from 5 to 20 mol of ethylene oxide per mol of amine, preferably oleylamines containing from 8 to 15 mol of ethylene oxide per mol of amine;

3.6 ethylene oxide-propylene oxide block polymers containing from 10 to 80% ethylene oxide and having molecular weights of from 1000 to 80 000;

3.7 adducts of ethylene oxide-propylene oxide with ethylenediamine.

Especially preferred surfactants according to the inventive process are alkylaryl sulphonates, amines and alkylphenol ethoxylates, in particular dodecylbenzenesulphonate, N,N-dimethylcocoamine, N,N-dicocomethylamine and nonyl phenol ethoxylate.

The surfactant is applied in the inventive process preferably in the range from 0.5 to 50% by weight, more preferably from 1 to 15% by weight and especially from 2 to 10% by weight, based on the amount of the pigment.

In a preferred embodiment of the inventive process C.I. Pigment Yellow 12 is treated with N,N-dimethylcocoamine, N,N-dicocomethylamine, dodecylbenzenesulphonic acid or nonyl phenol ethoxylate.

In another preferred embodiment of the inventive process C.I. Pigment Yellow 14 is treated with N,N-dimethylcocoamine.

In still another preferred embodiment of the inventive process C.I. Pigment Yellow 63 is treated with N,N-dimethylcocoamine.

A preferred embodiment of the present invention is furthermore directed to a process, wherein C.I. Pigment Orange 16 is treated with N,N-dimethylcocoamine.

In the process according to the present invention it is preferred that the pigment is treated with the surfactant before isolation of the pigment and in particular during the preparation process of the pigment.

If the fluorescent pigment to be prepared is an azo pigment, it is preferred that the treatment with the surfactant is carried out by addition of the surfactant to the reaction mixture prior to the coupling reaction and in particular by addition of the surfactant to the solution or suspension containing the coupling component. The solution or suspension containing the coupling component and the surfactant is then reacted with a solution or suspension of the amine previously diazotised in the usual manner. The coupled pigment is then isolated by conventional methods, e.g. filtration, washing with water and drying.

The fluorescence intensity of the pigments obtained by the inventive process is enhanced considerably when compared to the fluorescence intensity of the same pigment wherein treatment with a surfactant has been omitted. The enhancement at the wavelength of maximum intensity generally is by at least 10%, preferably by at least 15% and most preferably by at least 20%, compared to the untreated pigment.

A further object of the present invention is directed to the fluorescent organic pigments obtained by the inventive process described above, hereinafter designated as inventive organic pigments, wherein the variables have the meanings and preferred meanings given above.

A further embodiment of this invention relates to an organic pigment obtained according to the inventive process, wherein the organic pigment is C.I. Pigment Yellow 12 and the surfactant is N,N-dimethylcocoamine, N,N-dicocomethylamine, dodecylbenzenesulphonic acid or nonyl phenol ethoxylate.

A further embodiment of this invention is an organic pigment obtained according to the inventive process, wherein the organic pigment is C.I. Pigment Yellow 14 and the surfactant is N,N-dimethylcocoamine.

A further embodiment of this invention is an organic pigment obtained according to the inventive process, wherein the organic pigment is C.I. Pigment Yellow 63 and the surfactant is N,N-dimethylcocoamine.

A further embodiment of this invention is an organic pigment obtained according to the inventive process, wherein the organic pigment is C.I. Pigment Orange 16 and the surfactant is N,N-dimethylcocoamine.

The inventive organic pigments may be given an after-treatment to improve their properties, for example their dispersibility in inks, paints or plastics. Methods of after-treatment are well known to those skilled in the art of pigment manufacture.

A useful after-treatment is the resination of the inventive pigments using a natural or synthetic acidic group-containing resin. Resins which are soluble in alkaline solution and which may be precipitated onto the pigment with acid are preferred. Such preferred resins include, e.g. rosins, which may be gum rosins, wood rosins or tall oil rosins, rosin derivatives, such as rosin esters, hydrogenated rosins, disproportionated rosins, dimerised rosins or polymerised rosins, phenolic resins and carboxyl-containig maleic or fumaric resins. The resin may be present as an acid or as a metal or amine salt thereof. The proportion of the resin used in the after-treatment may vary within a wide range, and may amount to 1 to 60% by weight, more preferably from 25 to 55% by weight, based on the weight of the inventive organic pigment.

Another object of the present invention is directed to the use of a surfactant for enhancing the fluorescence of organic pigments, wherein the variables have the meanings and preferred meanings given below.

Another embodiment of the present invention relates to the use of the inventive fluorescent pigments as colourants, preferably in marking applications, in general by methods known per se, for example (a) for mass colouring polymers, where the polymers can be polyvinyl chloride, cellulose acetate, polycarbonates, polyamides, polyurethanes, polyimides, polybenzimidazoles, melamine resins, silicones, polyesters, polyethers, polystyrene, polymethyl methacrylate, polyethylene, polypropylene, polyvinyl acetate, polyacrylonitrile, polybutadiene, polychlorobutadiene or polyisoprene, or the copolymers of the cited monomers;

(b) for the preparation of paints, paint systems, in particular automotive lacquers, coating compositions, paper colours, printing colours, inks, in particular for use in ink-jet printers, and for painting and writing purposes, as well as in electrophotography, e.g. for dry copier systems (Xerox process) and laser printers;

(c) for security marking purposes, such as for cheques, cheque cards, currency notes, coupons, documents, identity papers and the like, where a special unmistakable colour impression is to be achieved;

(d) as an additive to colourants, such as pigments and dyes, where a specific colour shade is to be achieved, particularly luminous shades being preferred;

(e) for marking objects for machine recognition of these objects via the fluorescence, preferably for machine recognition of objects for sorting, e.g. including the recycling of plastics, alphanumerical prints or barcodes being preferably used;

(f) for the production of passive display elements for a multitude of display, notice and marking purposes, e.g. passive display elements, notices and traffic signs, such as traffic lights, safety equipment;

(g) for marking with fluorescence in the solid state;

(h) for decorative and artistic purposes;

(i) for modifying inorganic substrates such as aluminium oxide, silicium oxide, titanium dioxide, tin oxide, magnesium oxide (especially "stone wood"), silicates, clay minerals, calcium-, gypsum- or cement-containing surfaces, for example coatings or plaster surfaces;

(j) as rheology improvers;

(k) in optical light collection systems, in fluorescence solar collectors (see Nachr. Chem. Tech. Lab. 1980, 28, 716), in fluorescence-activated displays (see Elektronik 1977, 26, 6), in cold light sources used for light-induced polymerisation for the preparation of plastics, for testing of materials, for example in the production of semiconductor circuits, for analysing microstructures of integrated semiconductor components, in photoconductors, in photographic processes, in display, illumination or image converter systems, where excitation is effected by electrons, ions or UV radiation, e.g. in fluorescent displays, Braun tubes or in fluorescent lamps, as part of an integrated semiconductor circuit containing dyes as such or in combination with other semiconductors, for example in the form of an epitaxy, in chemiluminescence systems, e.g. in chemiluminescent flashlights, in luminescene immunoassays or other luminescence detection processes, as signal paints, preferably for visually emphasising strokes of writing and drawings or other graphic products, for marking signs and other objects for which a particular visual colour impression is to be achieved, in dye lasers, preferably as fluorescent dyes for generating laser beams, as optical recording medium and also as Q-switches;

(l) for converting the frequency of light, e.g. for turning short-wave light into long-wave visible light or for doubling or tripling the frequency of laser light in non-linear optics;

(m) for tracer purposes, e.g. in biochemistry, medicine, technology and natural science, where the novel colourants can be linked covalently to the substrates or via secondary valences, such as hydrogen bonds or hydrophobic interactions (adsorption); and (n) in highly sensitive detection processes (see Z. Analyt. Chem. 1985, 320, 361), in particular as fluorescent colourants in scintillators.

Preferred uses of the inventive pigments ar listed above under (a) to (i). The following examples illustrate specific aspects of the present invention and are not intended to limit the scope thereof in any respect and should not be so construed. In the examples, all parts are by weight unless otherwise indicated. The relationship of parts by weight to parts by volume is as that of kilograms to liters.

EXAMPLE 1 (COMPARATIVE)

A solution of 4.5 parts of acetic acid (100%) and 13.3 parts of hydrochloric acid (36%) in 60 parts of water is heated to 60° C. and added with rapid stirring to a solution of 28.7 parts of acetoacetanilide dissolved in a solution of 14.5 parts of sodium hydroxide (50%) in 270 parts of water. The resultant slurry is adjusted to 750 parts by addition of water and pH 6.0 by addition of sodium hydroxide (15%). This slurry is then reacted with 19.5 parts of 3,3'-dichlorobenzidine, previously tetrazotised with sodium nitrite and hydrochloric acid in the usual manner, with simultaneous addition of sodium hydroxide (15%) to maintain pH 4.8. The coupled pigment slurry is then heated to a temperature of 93° C. and maintained at this temperature for 30 minutes before being cooled to 70° C. by addition of water. The product is then filtered, washed with water to remove soluble salts, dried and converted to a powder by grinding.

EXAMPLE 2

A solution of 4.5 parts of acetic acid (100%), 13.3 parts of hydrochloric acid (36%) and 3.5 parts of N,N-dimethyl-cocoamine in 60 parts of water is heated to 60° C. and added with rapid stirring to a solution of 28.7 parts of acetoacetanilide dissolved in a solution of 14.5 parts of sodium hydroxide (50%) in 270 parts water. The resultant slurry is adjusted to 750 parts by addition of water and pH 6.0 by addition of sodium hydroxide (15%). This slurry is then reacted with 19.5 parts of 3,3'-dichlorobenzidine, previously tetrazotised with sodium nitrite and hydrochloric acid in the usual manner, with simultaneous addition of sodium hydroxide (15%) to maintain pH 4.8. The coupled pigment slurry is then heated to a temperature of 93° C. and maintained at this temperature for 30 minutes before being cooled to 70° C. by addition of water. The product is then filtered, washed with water to remove soluble salts, dried and converted to a powder by grinding.

EXAMPLE 3

A solution of 10 parts of acetic acid (100%) and 4 parts of N,N-dicocomethylamine in 50 parts of water is heated to 70° C. and added with rapid stirring to a solution of 28.7 parts of acetoacetanilide dissolved in a solution of 14.5 parts of sodium hydroxide (50%) in 270 parts of water. The resultant slurry is adjusted to 850 parts by addition of water and pH 6.0 by addition of acetic acid (100%). This slurry is then reacted with 19.5 parts of 3,3'-dichlorobenzidine, previously tetrazotised with sodium nitrite and hydrochloric acid in the usual manner, with simultaneous addition of sodium hydroxide (15%) to maintain pH 4.8. The coupled pigment slurry is then heated to a temperature of 90° C. and maintained at this temperature for 20 minutes before being cooled to 70° C. by addition of water. The product is then filtered, washed with water to remove soluble salts, dried and converted to a powder by grinding.

EXAMPLE 4

A solution of 4.5 parts of acetic acid (100%), 13.3 parts of hydrochloric acid (36%) and 4 parts of dodecylbenzene-sulphonic acid in 50 parts of water is heated to 70° C. and added with rapid stirring to a solution of 28.7 parts of acetoacetanilide dissolved in a solution of 14.5 parts of sodium hydroxide (50%) in 270 parts of water. The resultant slurry is adjusted to 850 parts by addition of water and pH 6.0 by addition of sodium hydroxide (15%). This slurry is then reacted with 19.5 parts of 3,3'-dichlorobenzidine, previously tetrazotised with sodium nitrite and hydrochloric acid in the usual manner, with simultaneous addition of sodium hydroxide (15%) to maintain pH 4.8. The coupled pigment slurry is then heated to a temperature of 90° C. and maintained at this temperature for 20 minutes before being cooled to 70° C. by addition of water. The product is then filtered, washed with water to remove soluble salts, dried and converted to a powder by grinding.

EXAMPLE 5

A solution of 4.5 parts of acetic acid (100%), 13.3 parts of hydrochloric acid (36%) and 4 parts of nonyl phenol ethoxylate containing 5 moles of ethylene oxide in 50 parts of water is heated to 70° C. and added with rapid stirring to a solution of 28.7 parts of acetoacetanilide dissolved in a solution of 14.5 parts of sodium hydroxide (50%) in 270 parts water. The resultant slurry is adjusted to 850 parts by addition of water and pH 6.0 by addition of sodium hydroxide (15%). This slurry is then reacted with 19.5 parts of 3,3'-dichlorobenzidine, previously tetrazotised with sodium nitrite and hydrochloric acid in the usual manner, with simultaneous addition of sodium hydroxide (15%) to maintain pH 4.8. The coupled pigment slurry is then heated to a temperature of 90° C. and maintained at this temperature for 20 minutes before being cooled to 70° C. by addition of water. The product is then filtered, washed with water to remove soluble salts, dried and converted to a powder by grinding.

EXAMPLE 6 (COMPARATIVE)

A solution of 4.5 parts of acetic acid (100%) and 13.3 parts of hydrochloric acid (36%) in 50 parts of water is heated to 70° C. and added with rapid stirring to a solution of 31.0 parts of acetoacet-o-toluidide dissolved in a solution of 14.5 parts of sodium hydroxide (50%) in 270 parts of water. The resultant slurry is adjusted to 850 parts by addition of water and pH 6.0 by addition of sodium hydroxide (15%). This slurry is then reacted with 19.5 parts of 3,3'-dichlorobenzidine, previously tetrazotised with sodium nitrite and hydrochloric acid in the usual manner, with simultaneous addition of sodium hydroxide (15%) to maintain pH 4.8. The coupled pigment slurry is then heated to a temperature of 90° C. and maintained at this temperature for 20 minutes before being cooled to 70° C. by addition of water. The product is then filtered, washed with water to remove soluble salts, dried and converted to a powder by grinding.

EXAMPLE 7

A solution of 4.5 parts of acetic acid (100%), 13.3 parts of hydrochloric acid (36%) and 4 parts of N,N-dimethylcocoamine in 50 parts of water is heated to 70° C. and added with rapid stirring to a solution of 31.0 parts of acetoacet-o-toluidide dissolved in a solution of 14.5 parts of sodium hydroxide (50%) in 270 parts water. The resultant slurry is adjusted to 850 parts by addition of water and pH 6.0 by addition of sodium hydroxide (15%). This slurry is then reacted with 19.5 parts of 3,3'-dichlorobenzidine, previously tetrazotised with sodium nitrite and hydrochloric acid in the usual manner, with simultaneous addition of sodium hydroxide (15%) to maintain pH 4.8. The coupled pigment slurry is then heated to a temperature of 90° C. and maintained at this temperature for 20 minutes before being cooled to 70° C. by addition of water. The product is then filtered, washed with water to remove soluble salts, dried and converted to a powder by grinding.

EXAMPLE 8 (COMPARATIVE)

A solution of 4.5 parts of acetic acid (100%) and 13.3 parts of hydrochloric acid (36%) in 50 parts of water is heated to 70° C. and added with rapid stirring to a solution of 32.3 parts of acetoacet-o-chloroanilide dissolved in a solution of 14.5 parts of sodium hydroxide (50%) in 270 parts of water. The resultant slurry is adjusted to 850 parts by addition of water and pH 6.0 by addition of sodium hydroxide (15%). This slurry is then reacted with 19.5 parts of 3,3'-dichlorobenzidine, previously tetrazotised with sodium nitrite and hydrochloric acid in the usual manner, with simultaneous addition of sodium hydroxide (15%) to maintain pH 4.8. The coupled pigment slurry is then heated to a temperature of 90° C. and maintained at this temperature for 20 minutes before being cooled to 70° C. by addition of water. The product is then filtered, washed with water to remove soluble salts, dried and converted to a powder by grinding.

EXAMPLE 9

A solution of 4.5 parts of acetic acid (100%), 13.3 parts of hydrochloric acid (36%) and 4 parts of N,N-dimethylcocoamine in 50 parts of water is heated to 70° C. and added with rapid stirring to a solution of 32.3 parts of acetoacet-o-chloroanilide dissolved in a solution of 14.5 parts of sodium hydroxide (50%) in 270 parts of water. The resultant slurry is adjusted to 850 parts by addition of water and pH 6.0 by addition of sodium hydroxide (15%). This slurry is then reacted with 19.5 parts of 3,3'-dichlorobenzidine, previously tetrazotised with sodium nitrite and hydrochloric acid in the usual manner, with simultaneous addition of sodium hydroxide (15%) to maintain pH 4.8. The coupled pigment slurry is then heated to a temperature of 90° C. and maintained at this temperature for 20 minutes before being cooled to 70° C. by addition of water. The product is then filtered, washed with water to remove soluble salts, dried and converted to a powder by grinding.

EXAMPLE 10 (COMPARATIVE)

A solution of 50 parts of acetoacetanilide and 24 parts of sodium hydroxide (50%) in 300 parts of water is added to a solution of 25 parts of sodium formate in 420 parts of water. To this solution is added 20.9 parts of acetic acid (100%) with rapid stirring. The resultant slurry is adjusted to 1500 parts at a temperature of 17° C. by addition of water and ice. This slurry is then reacted with 32.8 parts of o-dianisidine, previously tetrazotised with sodium nitrite and hydrochloric acid in the usual manner. Ice is added during the reaction to prevent the temperature rising above 20° C. The coupled pigment slurry is then heated to a temperature of 90° C. and maintained at this temperature for 60 minutes before being cooled to 70° C. by addition of water. The product is then filtered, washed with water to remove soluble salts, dried and converted to a powder by grinding.

EXAMPLE 11

A solution of 50 parts of acetoacetanilide and 24 parts of sodium hydroxide (50%) in 300 parts of water is added to a solution of 25 parts of sodium formate in 420 parts water. To this solution is added a solution of 6 parts of N,N-dimethylcocoamine in 20.9 parts of acetic acid (100%) with rapid stirring. The resultant slurry is adjusted to 1500 parts at a temperature of 17° C. by addition of water and ice. This slurry is then reacted with 32.8 parts of o-dianisidine, previously tetrazotised with sodium nitrite and hydrochloric acid in the usual manner. Ice is added during the reaction to prevent the temperature rising above 20° C. The coupled pigment slurry is then heated to a temperature of 90° C. and maintained at this temperature for 60 minutes before being cooled to 70° C. by addition of water. The product is then filtered, washed with water to remove soluble salts, dried and converted to a powder by grinding.

Inks are made from each of the pigment compositions described in Examples 1 to 11 and their fluorescence intensity is measured.

The inks are made by adding to a polyethylene container 200 g of 2.0–2.5 mm glass beads, 31 g of nitrocellulose varnish, 51 g of ethanol and 18 g of pigment. The mixture is shaken on a commercial dispenser for 45 minutes. 18 g of the resulting mill-base is strained and reduced by adding a further 17 g of nitrocellulose varnish along with 9 g of ethanol and 2.5 g of ethyl acetate. The final ink is then drawn down on non-absorbing paper using a K-bar.

The fluorescence intensities are measured by mounting the drawdowns onto glass slides and running fluorescence spectra using a Perkin-Elmer LS-5B fluorimeter.

The results are given in the following table:

TABLE

| Example | Pigment Type | Fluorescence Intensity |
|---|---|---|
| 1 (comparative) | C.I. Pigment Yellow 12 | 15 |
| 2 | C.I. Pigment Yellow 12 | 28 |
| 3 | C.I. Pigment Yellow 12 | 25 |
| 4 | C.I. Pigment Yellow 12 | 28 |
| 5 | C.I. Pigment Yellow 12 | 18 |
| 6 (comparative) | C.I. Pigment Yellow 14 | 8 |
| 7 | C.I. Pigment Yellow 14 | 14 |
| 8 (comparative) | C.I. Pigment Yellow 63 | 20 |
| 9 | C.I. Pigment Yellow 63 | 33 |
| 10 (comparative) | C.I. Pigment Orange 16 | 4 |
| 11 | C.I. Pigment Orange 16 | 11 |

A BRIEF DESCRIPTION OF THE DRAWINGS

FIG. 1 shows a plot of the spectral response for C.I. Pigment Yellow 12 obtained according to Example 1 (curve a: no surfactant) and according to Example 2 (curve b: surfactant) as a function of the wavelength between 400 and 650 nm.

The invention claimed is:

1. Method of enhancing fluorescence of a marking composition comprising a colorant, which method comprises adding as an additive to said colorant, an organic pigment with enhanced fluorescence which organic pigment is treated with a surfactant selected from the group consisting of alkylaryl sulphonates and alkylphenol ethoxylates prior to addition to said colorant.

* * * * *